(12) United States Patent
Chiesa

(10) Patent No.: US 9,381,981 B2
(45) Date of Patent: Jul. 5, 2016

(54) GYROSCOPIC STABILIZER FOR BOATS

(71) Applicant: ITEM MARE S.r.l., Turin (IT)

(72) Inventor: Roberto Chiesa, Turin (IT)

(73) Assignee: ITEM MARE S.r.l., Turin (IT)

( * ) Notice: Subject to any disclaimer, the term of this patent is extended or adjusted under 35 U.S.C. 154(b) by 115 days.

(21) Appl. No.: 14/305,710

(22) Filed: Jun. 16, 2014

(65) Prior Publication Data

US 2014/0366659 A1    Dec. 18, 2014

(30) Foreign Application Priority Data

Jun. 18, 2013    (IT) .............................. TO2013A0500

(51) Int. Cl.
  *B63B 39/04*    (2006.01)
  *G01C 19/02*    (2006.01)

(52) U.S. Cl.
  CPC ............... *B63B 39/04* (2013.01); *G01C 19/02* (2013.01); *Y10T 74/1229* (2015.01)

(58) Field of Classification Search
  CPC ............................... B63B 39/04; G01C 19/02
  See application file for complete search history.

(56) References Cited

U.S. PATENT DOCUMENTS

| | | | |
|---|---|---|---|
| 769,493 A * | 9/1904 | Schlick | .......................... 74/5.22 |
| 1,330,503 A * | 2/1920 | Thompson | ..................... 74/5.22 |
| 3,576,134 A | 4/1971 | Fersht | |

FOREIGN PATENT DOCUMENTS

| | | |
|---|---|---|
| WO | WO 2006/022847 A2 | 3/2006 |
| WO | WO 2009/049371 A1 | 4/2009 |
| WO | WO 2011/100796 A1 | 8/2011 |

OTHER PUBLICATIONS

Italian Search Report for corresponding Italian Patent Application No. TO2013A000500 mailed Mar. 10, 2014.
Extended European Search Report for corresponding European Patent Application No. 14172602.6 mailed Dec. 4, 2014.

* cited by examiner

*Primary Examiner* — Terence Boes
(74) *Attorney, Agent, or Firm* — Merchant & Gould P.C.

(57) ABSTRACT

An anti-rolling gyroscopic stabilizer for boats provides a stationary frame fixed to the hull, an oscillating frame and a flywheel. The angular velocity of oscillation of the oscillating frame is limited by hydraulic dampers. Elastic return elements are coupled to the dampers and urge the oscillating frame so as to orient the axis of rotation of the flywheel towards a given angular position in which the gyroscopic device acts with maximum efficiency.

9 Claims, 4 Drawing Sheets

GYROSCOPIC STABILIZER FOR BOATS

BACKGROUND OF THE INVENTION

The present invention relates to an anti-rolling gyroscopic stabilizer for boats, comprising a stationary frame having, connected thereto, a frame rotatable about a first axis and supporting a flywheel rotatable about a second axis perpendicular to the first axis.

An anti-rolling gyroscopic stabilizer of the aforementioned type makes use of the gyroscopic effect in order to dampen the rolling oscillation of the boat on which the stabilizer is mounted.

The gyroscopic effect occurs when a mass, caused to rotate about a generic first axis, owing to the action of an external force is subject to a rotation about a second axis perpendicular to the first axis, thereby generating a precession movement of the first axis in a direction perpendicular to the plane defined by the first and second axes.

The gyroscopic stabilizer performs the aforementioned damping action, opposing rolling movement with a reaction which is in counter-phase with respect thereto. For example, if it is assumed that the rolling movement has a sinusoidal characteristic (usually in phase with the acting force, or with the wave, in the case of a boat), the ideal reaction of the stabilizer would have a characteristic, which is also sinusoidal, offset or out of phase by 180° with respect to the acting force.

Furthermore there exists the problem of preventing the action, exerted by the gyroscopic effect on the flywheel support elements, from being concentrated within time transients which are too short, so as not to stress these support elements excessively. The prior art envisages, as a solution to the aforementioned problem, the use of devices for damping the precession velocity, which act on at least one of the pivots connecting together the fixed frame, integral with the boat, and the frame supporting the flywheel. Generally, the flywheel frame is suspended in an oscillating manner with respect to the fixed frame.

Oscillation of the flywheel frame must be limited, not only in terms of velocity, but also in terms of angular amplitude, such that it does not adversely affect the gyroscopic effect which helps stabilize the rolling movement. In fact, with an increase in the oscillation amplitude, the rolling opposition function of the gyroscopic effect will tend to diminish all the more, while increasing yawing of the boat. Therefore, it can be deduced that maximum stabilization of rolling by the gyroscopic effect is obtained with amplitudes of the precession movement which are close to zero, with respect to the direction which the axis of rotation of the flywheel would assume, relative to a fixed reference point integral with the external frame, assuming a condition of the stationary frame/oscillating frame/flywheel being undisturbed by external forces.

On the other hand, damping elements intended to limit the amplitude and velocity of oscillation of the frame do not help restore the optimum configuration. This is because the damping elements prevent (or at least do not facilitate) the return of the axis of rotation of the flywheel into the position which it would have assumed, relative to a fixed reference point integral with the external frame, in the case of an undisturbed condition of the stationary frame/oscillating frame/flywheel assembly.

This functional deficiency results in two main problems which concern: the efficiency of the device, since the capacity of influencing stabilization of the rolling movement is limited, owing to the fact that there is no active solution for restoring the optimum configuration of the relative positions of stationary frame, oscillating frame and flywheel; the reactivity of the device, since it tends to remain in the disturbed configuration as a result of inertia. This prevents, for example, any counter-turning manoeuvre where a first turning movement to one side of the hull is followed rapidly by a second turning movement to the opposite side.

SUMMARY OF THE INVENTION

The present invention overcomes all the aforementioned drawbacks by associating the aforementioned damping means with elastic means which, following a disturbance induced externally on the stationary frame/oscillating frame/flywheel assembly, reposition the stabilizer in its optimum operative configuration.

BRIEF DESCRIPTION OF THE DRAWINGS

The structural and functional characteristics of a plurality of preferred, but non-limiting embodiments of an anti-rolling gyroscopic stabilizer according to the invention will now be described, with reference to the accompanying drawings in which.

DETAILED DESCRIPTION OF THE PREFERRED EMBODIMENTS

Figure 1:
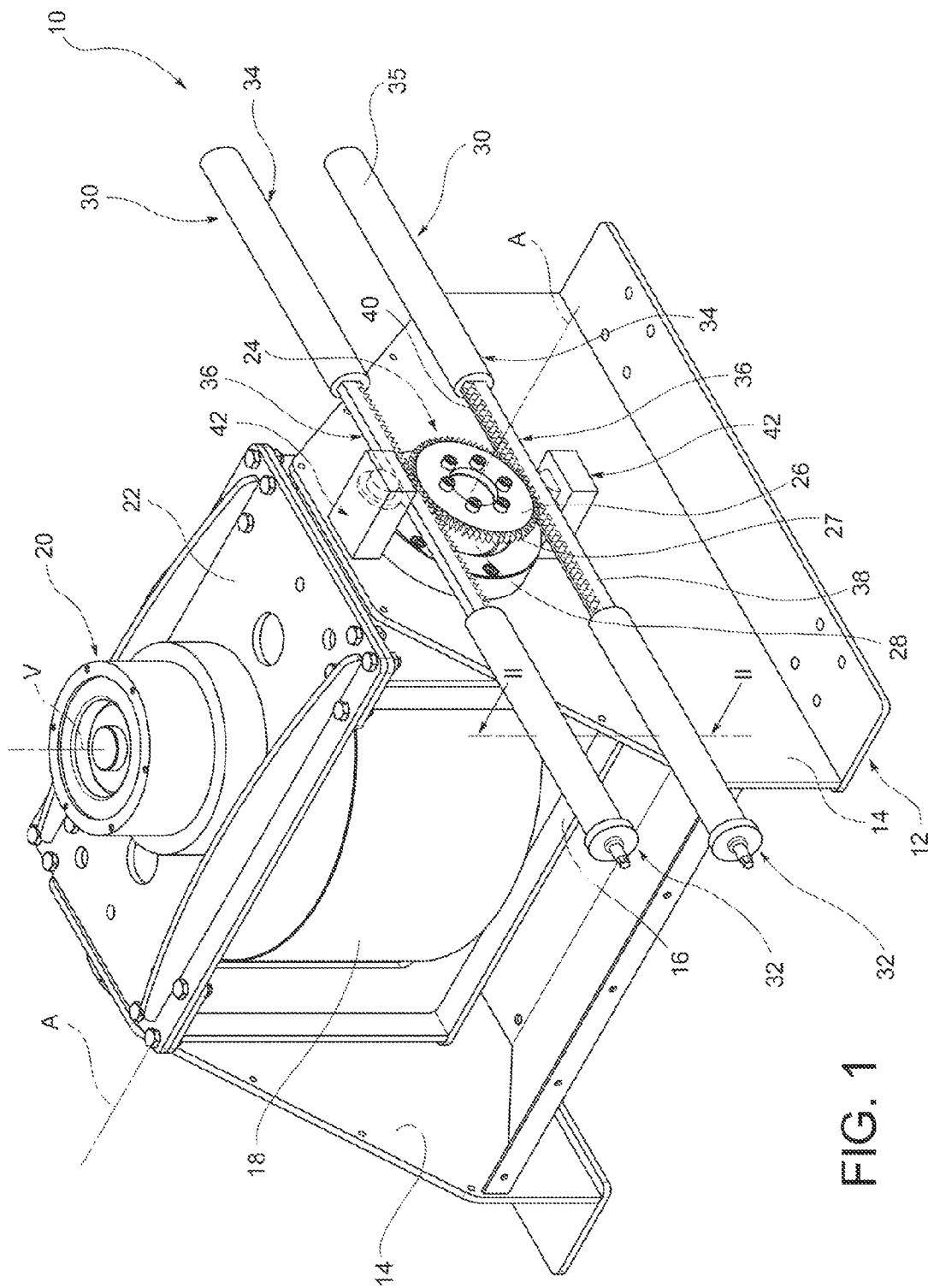
FIG. 1 is a perspective view which shows an anti-rolling gyroscopic stabilizer for boats, according to an embodiment of the present invention.

Before a plurality of embodiments of the invention is explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

Figure 2:
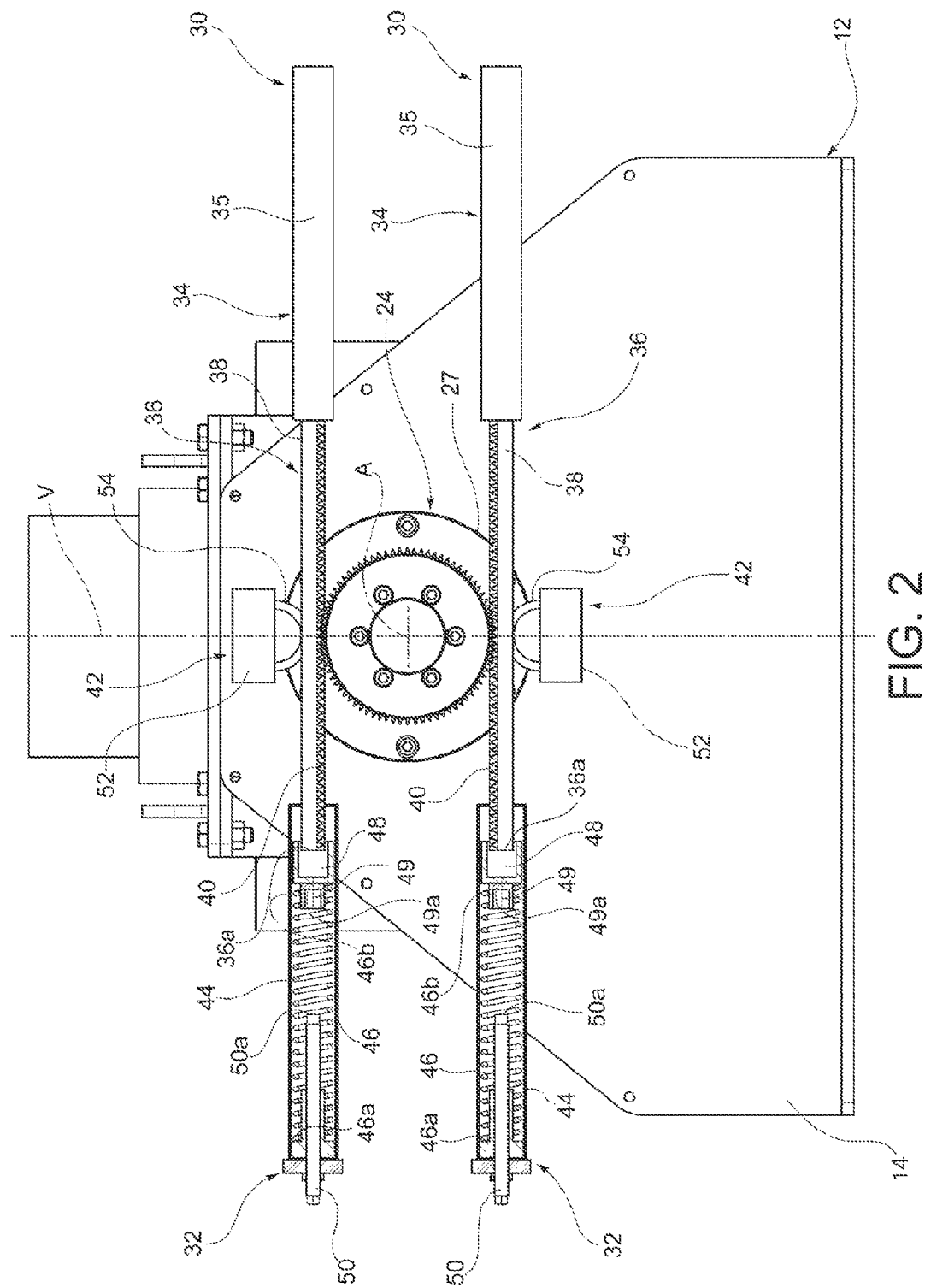
FIG. 2 is a cross-sectional side view of the stabilizer according to FIG. 1.

With reference now to FIGS. 1 and 2, a gyroscopic stabilizer 10 comprises a stationary frame 12 which is integral with the hull of a boat. The stationary frame 12, by means of uprights 14, supports an oscillating frame 16 via hubs 24. The frame 16 can be oscillated, with respect to the stationary frame 12, about an axis A.

A flywheel 18, rotatable about an axis V by means of a motor 20, is connected to the oscillating frame 16. A top plate 22 may be arranged so as to close the oscillating frame 16.

The hub 24 comprises a pivot 28, which extends along the axis A, and a flange 26, which extends transversely with respect to the axis A. The flange 26 has crown wheel 27 on its outer contour. Elastically damping devices 30 are connected to the flange 26 by means of the crown wheel 27. The devices 30 comprise, in the illustrated embodiment, a hydraulic damping element 34, of the type known per se, which performs essentially the function of limiting the maximum velocity of oscillation of the oscillating frame 16. Optionally, the hydraulic elements 34 are provided with suitable internal valves by means of which the hydraulic elements 34 are able not only to limit in the upper region the velocity of oscillation of the oscillating frame 16, but also adjust it in a preset manner.

In other embodiment, the damping element 34 is of the pneumatic, and not hydraulic type.

The hydraulic elements 34 include, in the illustrated embodiment, a pair of single-acting telescopic dampers which have a same internal volume capacity and are connected hydraulically to each other by means of pipes, not shown, such that the emptying of one causes the filling of the other. The hydraulic element 34 comprises an outer cylindrical casing 35 which is fixed to the stationary frame 12 by means of fastening elements, not shown.

According to an advantageous embodiment, an elastic element 32 is coupled, by means of a stem 36, to each hydraulic element 34. The elastic element 32 exerts a recall force on the oscillating frame 16 so that the axis of rotation V of the flywheel 18 is arranged in the position which it would have assumed, relative to the stationary frame 12, in the case of an undisturbed configuration of the stationary frame/oscillating frame/flywheel system. In this case, the undisturbed configuration, i.e. the relative position of the flywheel 18, the oscillating frame 16 and the stationary frame 12 which ensures the maximum stabilization of the rolling movement, is obtained when the axis V of the flywheel 18 has a direction perpendicular to the supporting plane of the stationary frame 12 which is integral with the hull of the vessel.

The recall action, exerted by the elastic element 32, is achieved by means of meshing of the crown wheel 27, which is integral with the flange 26, with a rack 40, which is integrally joined to the stem 36 by means of a support rod 38.

The elastic element 32 comprises a tubular seat 44 Which is fixed to the stationary frame 12 by means of fixing elements, not shown. The tubular seat 44 houses a helical spring 46 which has a distal end 46a to which an adjusting screw 50 is connected. A contact block 48, which is integral with a proximal end 36a of the stem 36, is connected to a proximal end 46b of the spring 46. The expressions "distal" and "proximal" must be understood as referring to a reference point centred on the hub 24.

A hollow cylindrical guide 49, projecting from the contact block 48, guides the spring 46 during its deformation, to a maximum travel position where an inner base 49a of the guide 49 abuts on a proximal end 50a of the screw 50. By adjusting the screw 50, it is possible to modify the end-of-travel position in which the inner base 49a of the guide 49 abuts against the proximal end 50a of the screw 50 in a fully compressed condition of the spring 46 where there is maximum inclination of the oscillating frame 16. Moreover, in an advantageous embodiment, the screw 50 is used for adjustment not only of the end-of-travel, but also of the pre-tensioned condition of the spring 46. In this way it is possible to vary the elastic response of the spring 46.

Therefore, the oscillation of the frame 16 about the axis A is dampened in terms of velocity by means of the hydraulic elements 34, opposed by the action of the elastic means 32. Oscillation of the frame 16 is limited in terms amplitude by the maximum stroke of the elastic elements 32. That maximum stroke is determined by the maximum distance between the inner base 49a of the guide 49 and the proximal end 50a of the screw 50.

In order to prevent the stems 36 from betiding owing to the dual stress produced by the hydraulic elements 34 and the elastic elements 32, the stems 36 are preferably guided by support structures 42 comprising a support housing 52, integral with the stationary frame 12, and a roller 54 rotatable on the stem 36.

According to the embodiment shown in FIGS. 1 and 2, there are two single-acting dampers and two helical springs coupled thereto by means of stems provided with racks. According to another embodiment, not shown, a single double-acting damping element 34 is provided (capable therefore of working both under traction and under compression) connected to the crown wheel 27 by means of the rack 40 of a stem 36 having its proximal end 36a which is free, i.e. not connected to the elastic element 32. On the other hand, the elastic element 32 may be mounted, instead, with respect to the hub 24, in a mirror-image position diametrically opposite to the hydraulic element 34. In turn, the elastic element 32 may be connected to the crown wheel 27 by means of the rack 40 of a stem 36 having its proximal end 36a free, i.e. not connected to the hydraulic element 34.

According to another embodiment, not shown, the elastic elements 32, instead of comprising the helical spring 46, comprise air springs. In this case, the maximum compression stroke, instead of being between the proximal end 50a of the screw 50 and the end 49a of the guide 49, will be optionally defined by the distance of two contact blocks situated inside the springs and integral with the outer flanges to which the flexible membranes of the air springs are fixed.

Figure 3:
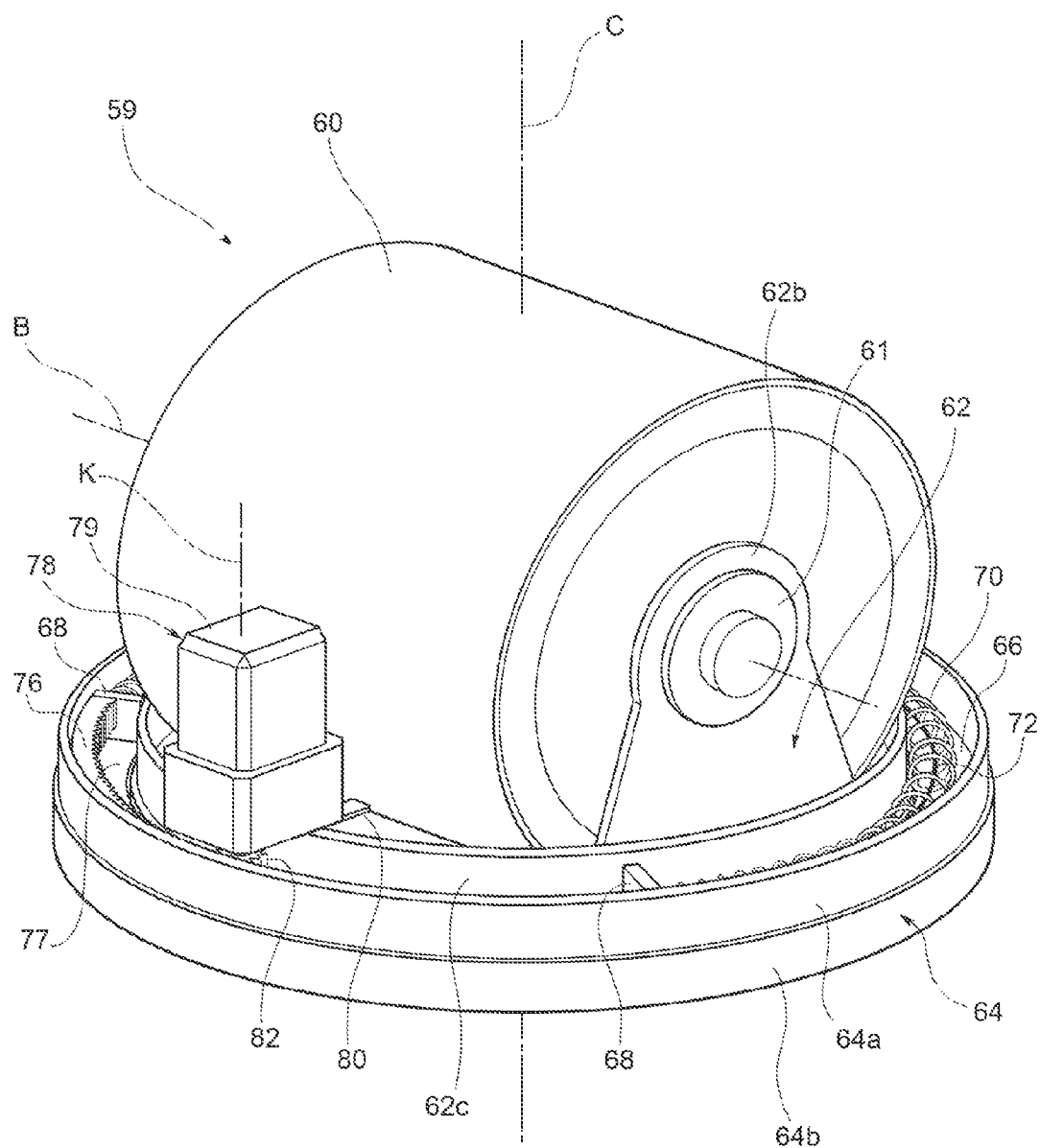
FIG. 3 is a perspective view of the stabilizer according to another embodiment.
Figure 4:
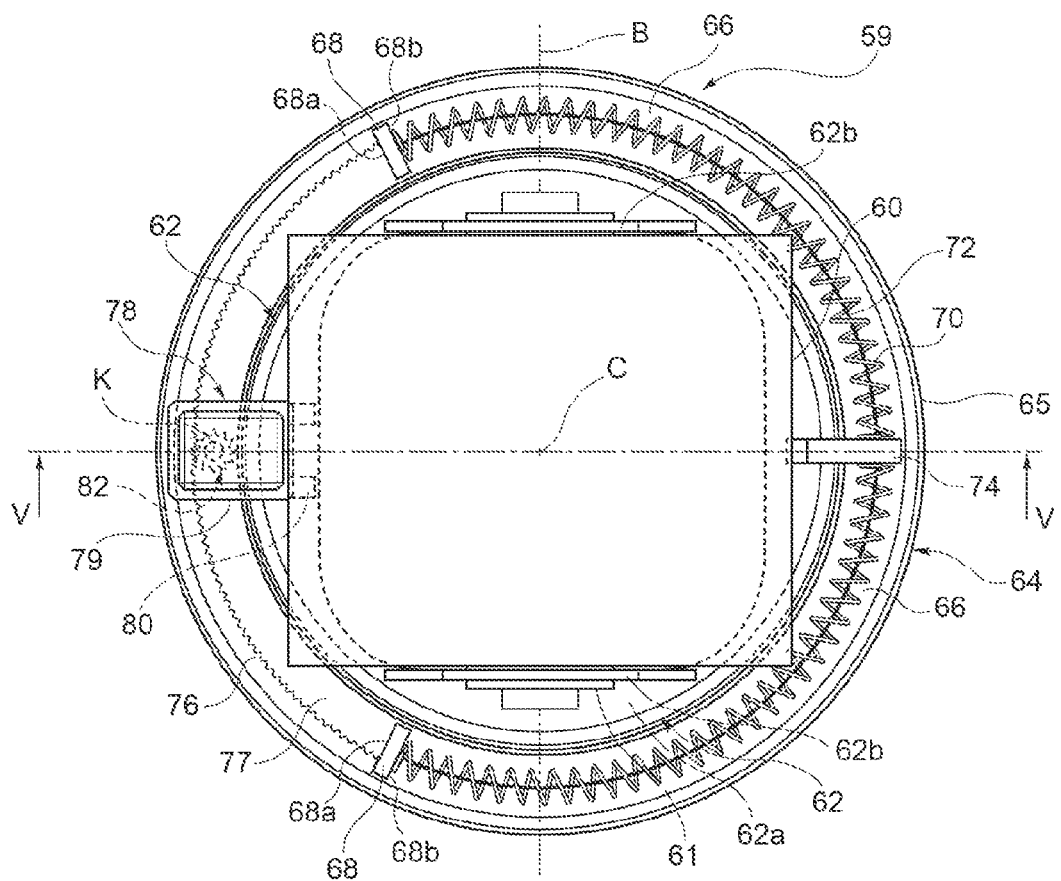
FIG. 4 is a top plan view of the stabilizer according to FIG. 3.
Figure 5:
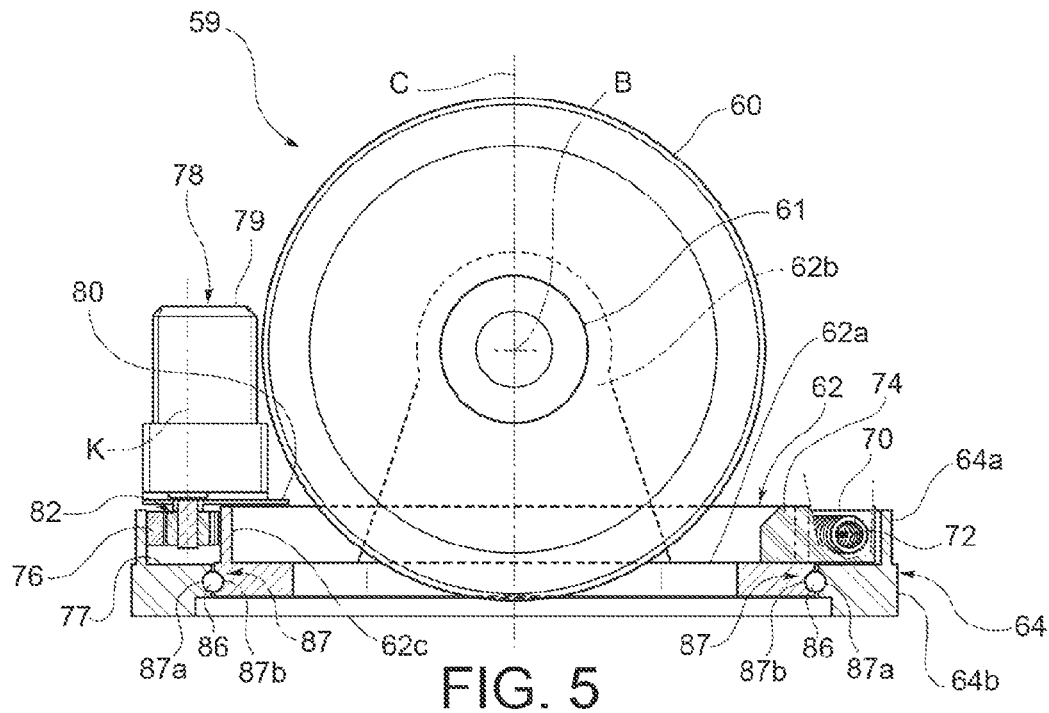
FIG. 5 is a cross-sectional view along the line V-V of the stabilizer according to FIG. 4.

With reference now to FIGS. 3, 4 and 5, a further embodiment of a gyroscopic stabilizer according to the invention will be described. A gyroscopic stabilizer 59 comprises a flywheel 60, an oscillating frame 62 and an external stationary frame 64. The frame 64 can be integrally fixed to the hull of the boat. The oscillating frame 62 comprises in this example a base ring 62a, two vertical uprights 62b, which support the flywheel 60 by means of pivots 61, and an inner ring 62c. The base ring 62a is rotatable and concentrically seated inside the stationary frame 64.

The flywheel 60 is rotatable about an axis B. Axis B is parallel to the plane in which the stationary frame 64 is fixed to the hull of the boat and perpendicular to the longitudinal axis of the boat. The oscillating frame 62 is instead rotatable about an axis C, which has a direction perpendicular to the fixing plane of the stationary frame 64.

Therefore, a rolling oscillation about an axis perpendicular to the axis B of rotation of the flywheel 60 generates, owing to the gyroscopic effect, a rotation of the oscillating frame 62 about the axis C, with respect to the stationary frame 64.

The stationary frame 64 comprises an outer ring 64a arranged on top of a ring-shaped base plate 64b. The base ring 62a of the frame 62 oscillates concentrically with respect to the base plate 64b. Preferably, the base ring 62a has, on its outer rim, a seat 87b which, when coupled with a matching seat 87a formed in the base plate 64b, forms a seat 87 housing rolling members 86, in the illustrated example, the seats 87a and 87b have a semi-toroidal shape and therefore, when coupled together, form a toroidal seat 87 able to house rolling balls. According to another embodiment, not shown, the seat 87, which is suitably shaped, houses rolling rollers, instead of balls.

The rolling members 86 facilitate relative rotation of the base plate 64b and the base ring 62a, allowing the oscillating frame 62 to be rotatable about the axis C.

Curved tracks 66, each of which seats a spring 70, are formed between the outer ring 64a and inner ring 62c. Each spring 70 extends between a surface 68b of a fixed shoulder 68, which is integral with the fixed frame 64, and a rotatable bracket 74, which is integral with the oscillating frame 62. The springs 70, optionally, are guided internally by a curved rod 72, which is also secured at its ends to the surfaces 68b of the two shoulders 68. The curved segment 77, situated between the surfaces 68a of the two shoulders 68, contains a curved or circular rack 82 on which a hydraulic operating machine 78 meshes, by means of a pinion 82, which pinion 82 is rotatable about an axis K. The hydraulic operating machine 78 is a pump of the known type, contained inside a casing 79, integral with the oscillating frame 62 by means of brackets 80.

The rotation of the oscillating frame 62 about the axis C, due to the gyroscopic effect produced by the rolling movement of the flywheel 60, is counterbalanced by the damping effect ensured by the hydraulic operating machine 78 and by the recall action due to the springs 70, which urge the oscillating frame 62 back into a position of maximum efficiency (in the case in question, the position which ensures the transverse arrangement of the axis B of rotation of the flywheel 60 with respect to the longitudinal axis of the boat).

The recall action of the oscillating frame 62 into its position of maximum efficiency is ensured by the springs 70 which are actuated by the rotatable bracket 74 also integral with the oscillating frame 62, such that the oscillating frame 62, rotating about the axis C, by means of the rotating bracket 74, receives the recall thrust of the springs 70 and returns into its operating position of maximum efficiency.

The main advantage of a stabilizer provided in accordance with the present invention, in the embodiment illustrated in FIGS. 3, 4 and 5, consists in the possibility of using a recall force which is provided by the springs 70 and allows restoration of the optimum operating condition of the stabilizer.

What is claimed is:

1. A gyroscopic stabilizer for boats, comprising:
a stationary frame fixable to the hull of a vessel;
an oscillating frame rotatably mounted to the stationary frame about a first axis;
a flywheel assembly mounted to the oscillating frame so as to rotate about a second axis perpendicular to the first axis;
a damping element, mechanically connected to the oscillating frame for adjusting angular velocity of oscillation of the oscillating frame about the first axis;
an elastic return element, operatively associated with the damping element and the oscillating frame, the elastic return element elastically urging said oscillating frame in such a way as to orient the second axis towards a given angular position with respect to the first axis;
a rigid rectilinear element connecting the damping element and the elastic return element, the rigid rectilinear element having a first end engaging the damping element and a second opposite end engaging the elastic return element;
a one flange extending transversely with respect to the pin; and
a crown wheel operatively connecting the flange to the rigid rectilinear element, the crown wheel being integral with the flange, the crown wheel meshing with a rack which is integral with the rigid rectilinear element.

2. The gyroscopic stabilizer of claim 1, wherein the oscillating frame is supported by the stationary frame by at least one hub comprising at least one pin, the hub being operatively connected to the damping element and the elastic return element.

3. The gyroscopic stabilizer of claim 1, wherein the oscillating frame is elastically urged towards said predetermined angular position by at least two elastic return elements acting in pairs on at least one hub connecting the oscillating frame to the stationary frame.

4. The gyroscopic stabilizer of claim 3, wherein said elastic return elements act on the hub in opposite directions.

5. The gyroscopic stabilizer of claim 1, further comprising an adjusting device translatable in a direction parallel to or coinciding with a direction along which a straight line of action of an elastic force exerted by the elastic element lies, said adjusting device having an abutting surface which acts against one end of the elastic element, determining a maximum compression stroke to which the elastic element can be subjected.

6. A gyroscopic stabilizer for boats, comprising:
a stationary frame fixable to the hull of a vessel;
an oscillating frame rotatably mounted to the stationary frame about a first axis;
a flywheel assembly mounted to the oscillating frame so as to rotate about a second axis perpendicular to the first axis; and
a damping element mechanically connected to the oscillating frame for adjusting angular velocity of oscillation of the oscillating frame about the first axis;
an elastic return element, operatively associated with the damping element and the oscillating frame, the elastic return element elastically urging said oscillating frame in such a way as to orient the second axis towards a given angular position with respect to the first axis;
wherein the elastic return element acts on the oscillating frame in a circumferential direction with respect to the first axis.

7. The gyroscopic stabilizer of claim 6, wherein the elastic return element is housed along a curved track lying between the oscillating frame and the stationary frame.

8. The gyroscopic stabilizer of claim 6, wherein the elastic return element comprises:
a first end adapted to engage against a shoulder integral with the stationary frame, and
a second end adapted to engage on an element rotationally integral with the oscillating frame.

9. The gyroscopic stabilizer of claim 8, wherein the stabilizer comprises two elastic return elements which elastically urge the oscillating frame towards said predetermined angular position, said elastic return elements acting in two circumferentially opposite directions about the first axis.

* * * * *